(12) United States Patent
Fauveau (10) Patent No.: US 7,367,231 B1
(45) Date of Patent: May 6, 2008

(54) FLEXIBLE GUIDED WAVE LEVEL METER PROBE

(75) Inventor: Eric Fauveau, Baton Rouge, LA (US)

(73) Assignee: K-Tek, Corp., Prairieville, LA (US)

( * ) Notice: Subject to any disclaimer, the term of this patent is extended or adjusted under 35 U.S.C. 154(b) by 4 days.

(21) Appl. No.: 11/175,698

(22) Filed: Jul. 6, 2005

(51) Int. Cl.
*G01F 23/22* (2006.01)

(52) U.S. Cl. .................... 73/304 R; 73/304 C (58) Field of Classification Search .......... 73/304 R, 73/304 C
See application file for complete search history.

(56) References Cited

U.S. PATENT DOCUMENTS

| | | | |
|---|---|---|---|
| 5,397,995 A * | 3/1995 | Anderson | 324/684 |
| 5,661,405 A * | 8/1997 | Simon et al. | 324/697 |
| 6,490,920 B1 * | 12/2002 | Netzer | 73/304 C |
| 6,894,226 B2 * | 5/2005 | Yokoi et al. | 174/102 R |
| 2004/0140814 A1 * | 7/2004 | Bletz et al. | 324/644 |
| 2005/0024259 A1 * | 2/2005 | Berry et al. | 342/124 |

* cited by examiner

*Primary Examiner*—Hezron Williams
*Assistant Examiner*—Paul M West
(74) *Attorney, Agent, or Firm*—Jones, Walker, Waechter, Poitevent, Carrere & Denegre, L.L.P.

(57) ABSTRACT

The invention is a level meter having a flexible probe. The flexible probe includes a flexible conductor and at least one flexible band shield member disposed in a substantially vertically parallel relationship with the conductor, where the conductor and the shield member are offset from each other.

11 Claims, 8 Drawing Sheets

SECTION 1A-1A

SECTION A-A

FIGURE 2B

SECTION B-B

SECTION 7A-7A

FLEXIBLE GUIDED WAVE LEVEL METER PROBE

BACKGROUND OF THE INVENTION

Level meters, particularly guided wave and capacitance meters, are well known in the art as devices for determining liquid levels in tanks. Generally, these devices consist of a probe contained in a tank, and electronics for generating/detecting signals. In the guided wave meter, a generated signal is coupled to the probe, and transmitted down the probe, using time domain reflectometry principles. When the signal reaches a fluid interface in the tank with a corresponding change in dielectric constants, a reflection is generated which travels up the probe to be detected by the instrument's electronics. The travel time is converted into a usable format representative of the level of fluid within the container or tank represented by the fluid interface. In capacitance level meters, the probe consists of two separated conductive members, and the meter measures the capacitance between the members. The capacitance changes between the members based upon the fluid fill and fluid levels between the conductive members. In either meter, the probe is placed in the tank containing the product media or in a side chamber that is fluidly connected to the tank. The probe is generally a rigid rod or cable orientated vertically in the tank.

In a guided wave (such as a guided wave radar level meter), the probe helps signal propagation and reduce signal losses from the traveling electromagnetic signal propagating down the probe as the probe affords a highly efficient path for pulse travel so that degradation of the signal is minimized. Further, because the pulse signals are channeled by the probe, turbulence or tank obstructions should not affect the measurement. Guided wave radar can handle varying specific gravity and media buildup or coatings. It is an invasive method, though, and the probe may be damaged by the blade of an agitator or the corrosiveness of the material being measured. Specially designed probe configurations allow extremely low dielectric materials ($K<1.7$ vs. $K=80$ for water) to be effectively measured.

One configuration used to measure low dielectric materials and to further reduce signal losses of the traveling pulse is to position the probe inside an outer metal jacket, such as a cylinder (or a stilling-well), creating a coaxial cable type structure having on outer cylindrical shield member, annular gap, and center positioned conductor. The conductor is electrically connected to the signal generation and reception electronic. Fluid enters the annular gap though openings in the outer shield member. Hence, the liquid level forms an interface within the coaxial structure to be detected by the pulse traveling on the surface of the conductor. Generally the outer shield member is an inert media sleeve, such as an aluminum or stainless steel tube that forms a concentric tube surrounding the entire enter conductor length. The outer shield functions as a further wave guide and acts as a ground plane to help channel the energy coupled to the conductor, thereby allowing the sensor to detect more subtle dielectric changes and correctly indicate the level of the product in the tank. Unfortunately, such a configuration can be subject to buildup or caking of product within the annular space which potentially can result in obstruction of the annular space and a non-functioning or malfunctioning device.

One design used to overcome the buildup of product or media in the annular space is to use a rod or cable running parallel with the conductor as the ground plane, instead of a concentric tube. The single parallel cable or rod helps to contain or channel the transmitted and reflected energy pulses near the vicinity of the probe. The parallel rod is more effective that a single rod or cable in air, but less effective than a device using the outer concentric shield as an additional waveguide. The dual parallel rod or cable probe is not as susceptible to media build up between the cables or rods as is the coaxial type structure.

Figure 8:
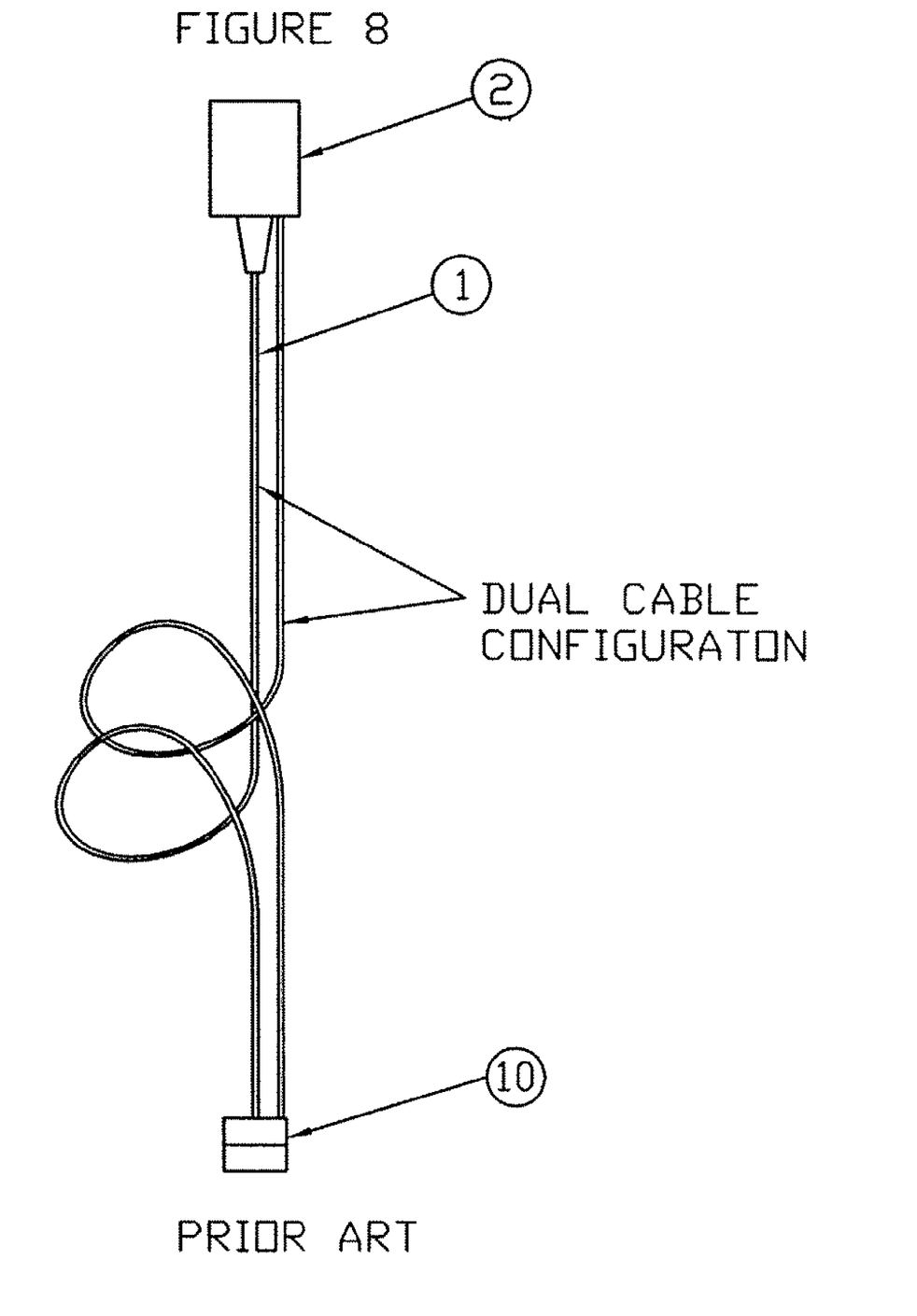
FIG. 8 shows a prior art dual cable flexible probe design.

Guided wave transmitters and capacitance meters are suitable for installation in deep tanks or silos, such as 100 feet or deeper. However, placement of the probe in large tanks requires suitable clearance. Hence, for tanks in excess of 30-50 feet, a rigid probe is problematic from a handling and installation standpoint. For this reason, in deep tanks or installations lacking sufficient clearance, flexible cable probe is generally used. However, in deep tanks, attenuation or energy loss in a guided wave device can be severe, and hence, a dual cable design waveguide construction, such as shown in FIG. 8, can help to reduce energy loss. However a more efficient flexible probe device is needed both for a guided wave level meters and a capacitance type level meter.

SUMMARY OF THE INVENTION

The invention is a flexible probe used in a level meter, where the probe includes a single flexible conductor and one or more flexible side members placed substantially parallel with the conductor. Alternatively, the side members can be a single flexible shaped member, encompassing at least about 30 degree of arc about the conductor and more preferably, about 45-180 degree arc. Alternatively, the side members can be a flexible braided metal construct surrounding the conductor.

OBJECTS OF THE INVENTION

It is an object of the invention to have a flexible probe that reduces signal dispersion and improves the ability to measure low dielectric materials.

It is an object of the invention to have a flexible probe that more closely approximates a coaxial type guided wave probe.

BRIEF DESCRIPTION OF THE DRAWINGS

FIG. 2A shows a cross section through the flexible probe at a spacer location, while

FIG. 7A shows a cross section through the flexible probe when the arcuate shaped shield member occupies about 30 degrees of arc, while

DETAILED DESCRIPTION OF THE INVENTION

The flexible probe will be described in the context of a guided wave radar level meter, but the flexible probe can be used with other level meters, particularly such as capacitance level meters.

Figure 1:
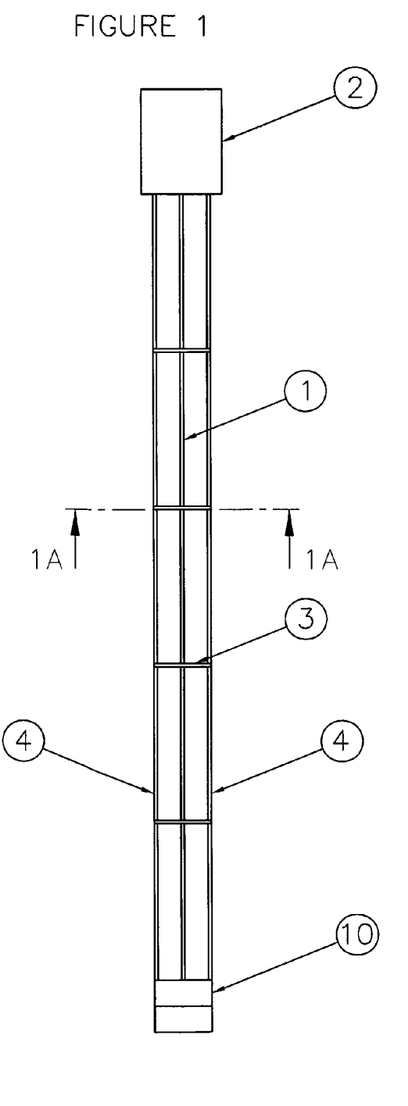
FIG. 1 shows a guided wave level meter with a center conductor and two side band shield members.
Figure 1A:
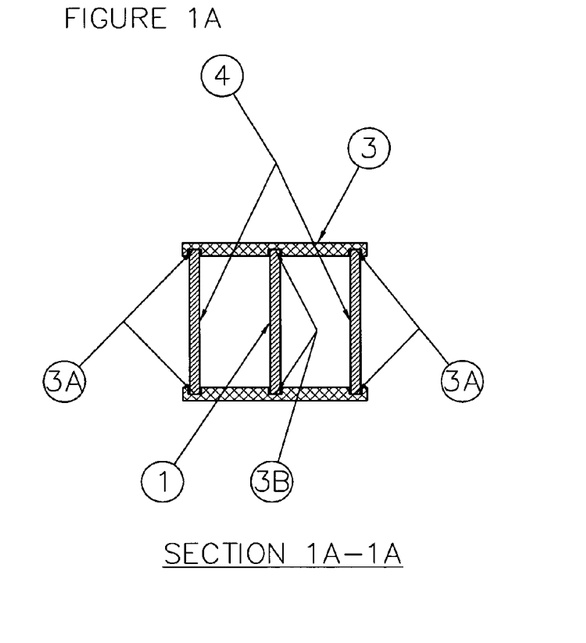
FIG. 1A shows a cross section through the flexible probe at a spacer location.

Shown in FIG. 1 is one embodiment of the flexible probe device. Shown is center conductor 1. Center conductor 1 is electrically coupled to the signal generator/receiver electronics package 2, and operates as the primary transmission path of the incident and reflected signal pulses within the tank. Center conductor 1 can be a flexible metal band, such as a 0.75 to 2.0 inch wide inert metal alloy band, such as stainless steel or aluminum, where the band can be about 0.01 inch to 0.1 inches thick or thicker, provided flexibility is maintained. Alternatively, center conductor can be a conventional flexible cable. Positioned on both sides of the center conductor 1, about 180 degrees apart, are two metal bands 4, (the side band shield members 4 width can be less than, equal to, or greater that of a center band conductor) creating a secondary side wave guide effect about the center conductor 1. At intervals, (about every two feet) the three bands are spatially fixed with respect to each other though through the use of an inert plastic spacer 3 (such as a teflon type spacer). The spacers are used to maintain the conductor and the side band shield member in an offset relationship. One embodiment of a spacer 3 is shown in FIG. 3. The spacer 3 is designed to present a minimal horizontal cross section to minimize its impact on a pulse traveling on the center conductor 1. As shown in FIG. 1, each band 4 is inserted through a slots in the spacer 3, with two outside slots for 3A the outer bands 4 and an inner slot 3B for the center conductor 1. The spacer 3 can be maintained at a particular height about the bands 4 by crimping to the bands as the desired location or attaching clips above and below the bands. The terminal or remote end of the wave guided probe is fitted with one or several weights 10 to which the conductor and side shield members are attached. The weight (s) are designed to maintain the entire wave guided probe under tension and hence properly orientated within the tank.

Figure 2:
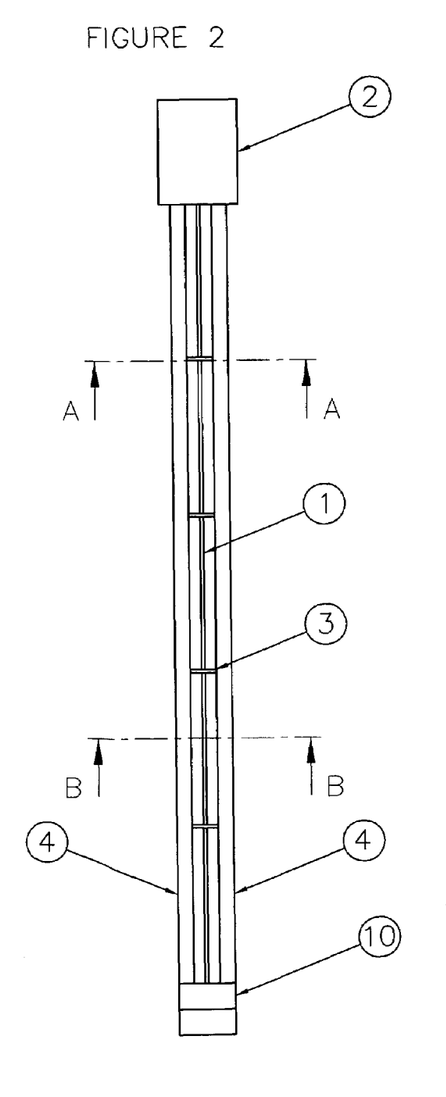
FIG. 2 shows a guided wave level meter with a center cable conductor and two side band shield members.
Figure 2A:
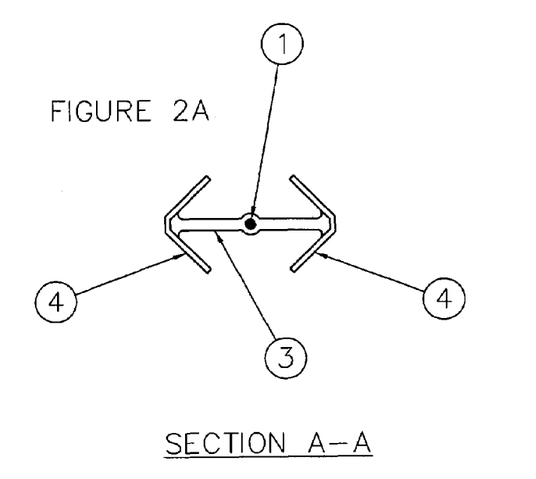
Figure 2B:
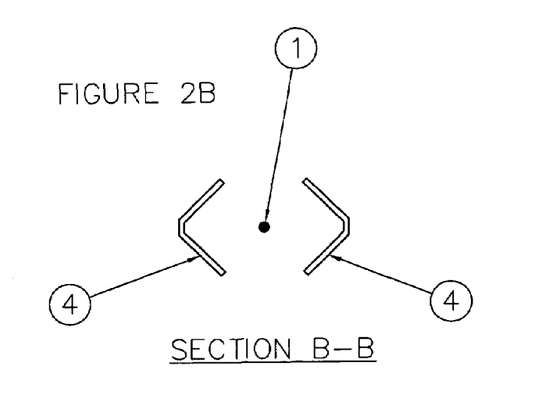
FIG. 2B shows a cross section through the probe.
Figure 7:
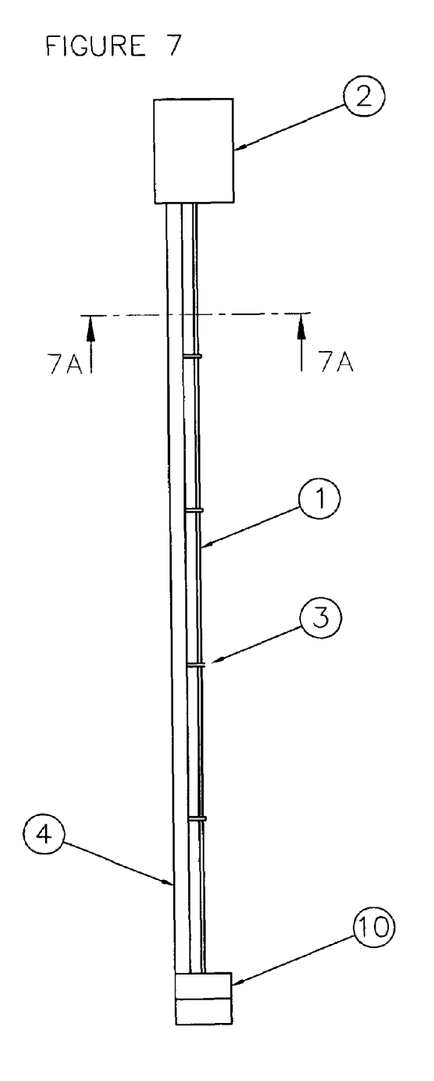
FIG. 7 shows a guided wave level meter with a center cable conductor and a single side band shield member.

The side shield band members 4 are more efficient than the prior art side cable guide as the bands more closely approximate a surrounding outer jacket. Further, because the bands 4 are flexible, the entire probe is easily installed in deep tanks. While the two bands 4 do not have to be 180 degrees apart, such an orientation is preferred for a two band embodiment, as the two outer bands can lay flat on each other making the device extremely flexible and hence easily transportable. Additional bands could be utilized, such as a three band triangular configuration shown in FIG. 3A, the four band configuration shown in FIG. 3B, etc., with suitable modifications to the spacers. Also, the bands 4 can be arc shaped, as depicted in the configurations shown in FIGS. 2, 3 and 7. The arcuate shaped bands more closely approximate an enclosing jacket, remain flexible but add a degree of rigidity to the side bands thereby reducing the amount of weight required at the probe terminal end.

Figure 4:
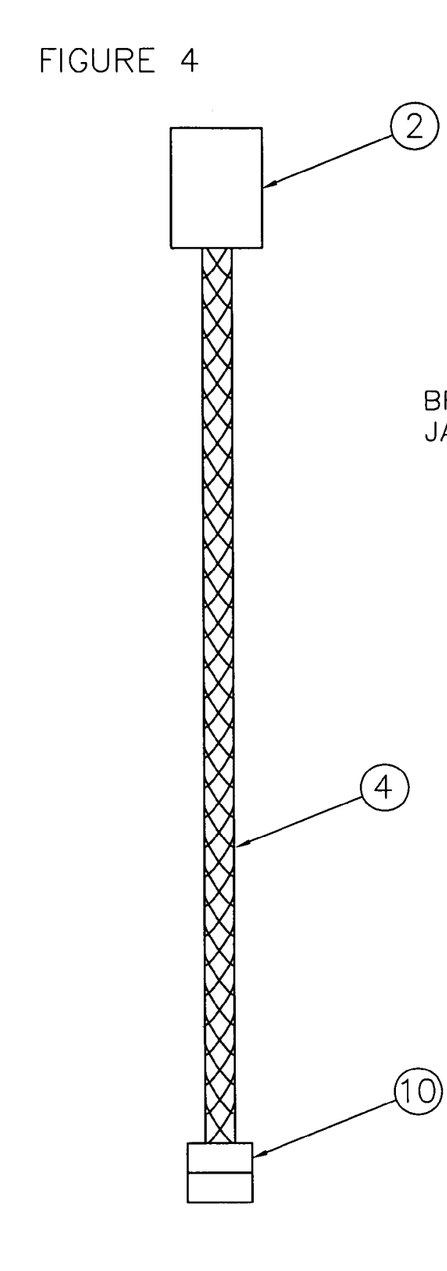
FIG. 4 shows a guided wave level meter with a center conductor and an enclosing braided shield member.
Figure 4A:
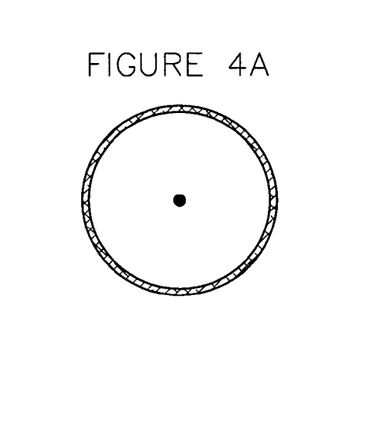
FIG. 4A shows a cross section through the flexible probe.
Figure 5:
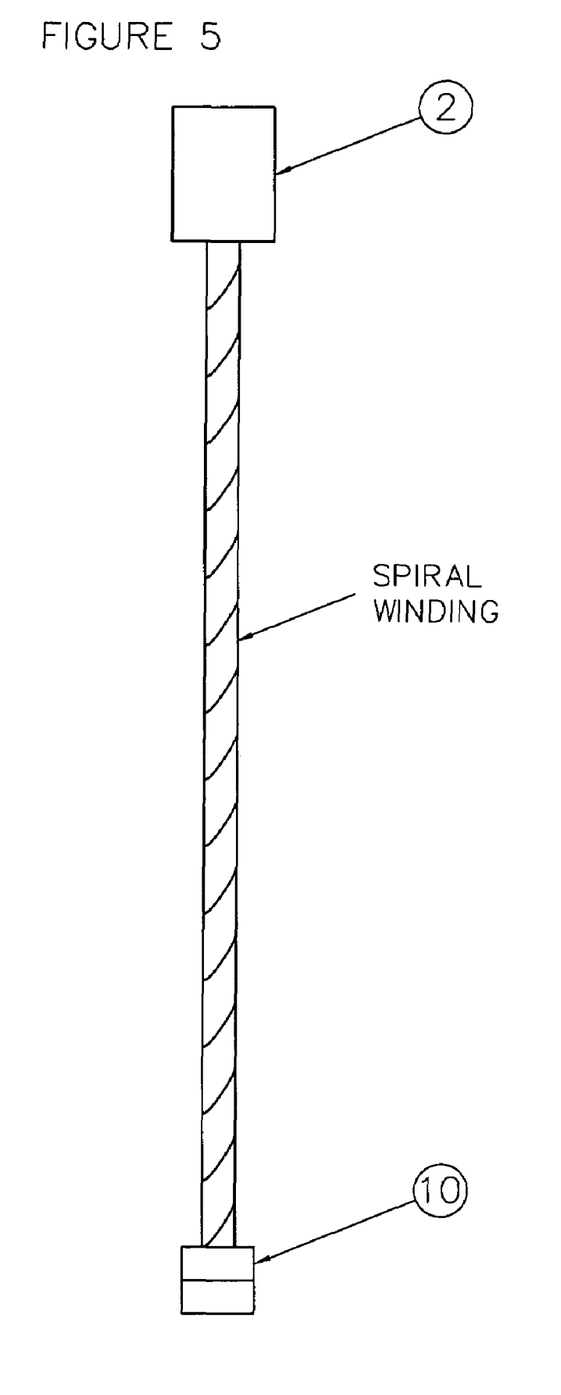
FIG. 5 shows a guided wave level meter with a center band conductor and an enclosing spiral shield member.
Figure 6:
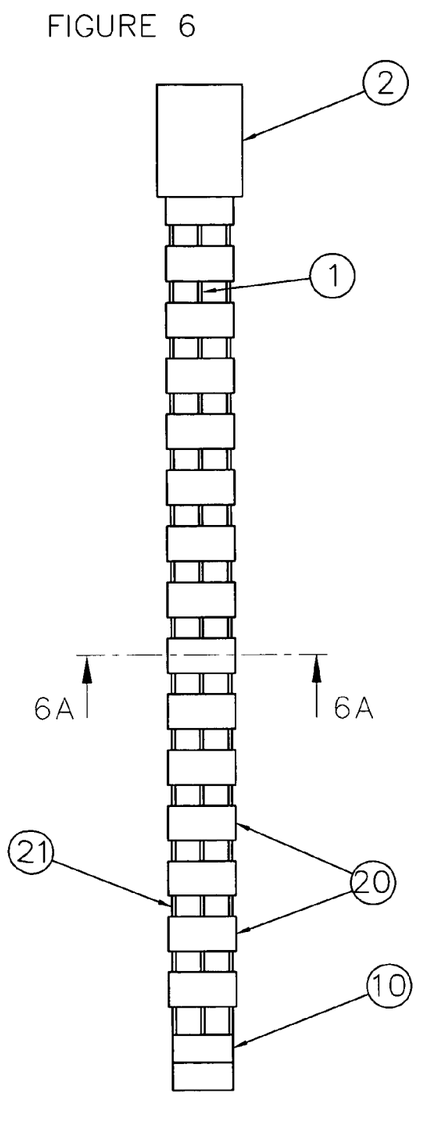
FIG. 6 shows a guided wave level meter with a center cable conductor and a serried of annular band shield members disposed vertically about the center cable.

A full enclosing flexible outer shield jacket member can also be used by employing a braided metal shield as the outer side shield member, such as shown in FIG. 4, or a spiral enclosing shield member created from a single band as shown in FIG. 5. Spacers must also be used in these configurations to keep the braided or spiral shield members separate from the center conductor as the shield members should be grounded. One problem associated with a braided enclosing shield member is that the spaces between the braids on the shield can become caked with media or impurities in the media making the device less flexible after installation, potentially presenting problems if later maintenance on the probe is required and potentially reducing the ability of liquids to flow through the shield into the annular interior space. For this reason, it may be necessary to place a series of vertically spaced openings in the braided shield member or the spiral band shield member (or have sufficient spaces between adjacent spirals). Such openings would not be necessary if a braided band member was used as a side band shield member in lieu of a one piece metal band shield member. Another embodiment of an enclosure type shield member or jacket is to use a series of circular metal bands connected in a vertically spaced relationship using small diameter cables or bands, such as shown in FIG. 6. This banded arrangement is not preferred as the costs in materials and assembly is greater.

Figure 3A:
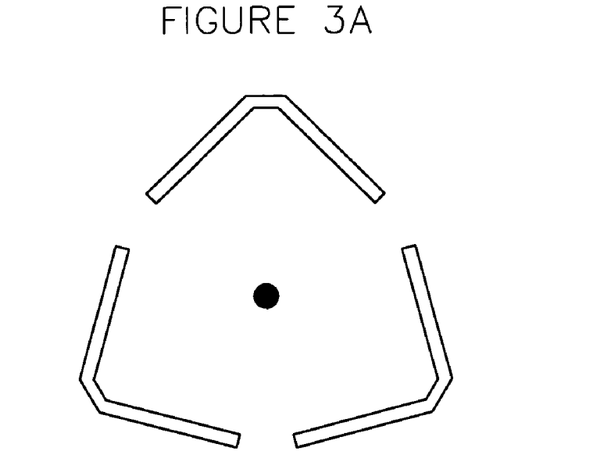
FIG. 3A shows a cross section through a flexible probe with a center cable conductor and three triangular shaped shield members surrounding the center cable.
Figure 3B:
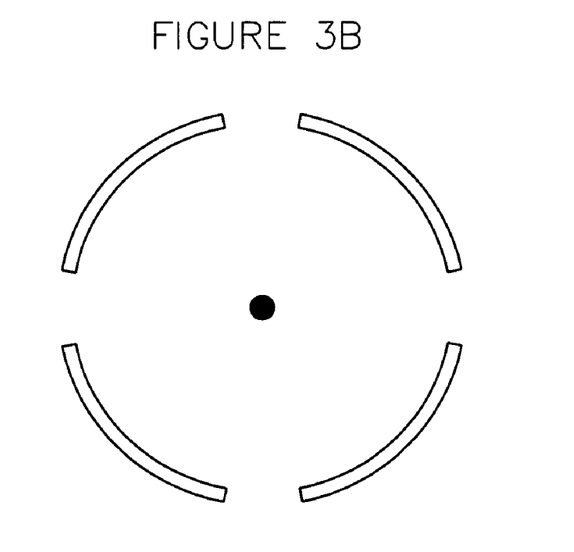
FIG. 3B shows a cross section through a flexible probe with a center cable conductor and four curvilinear shaped shield members surrounding the center cable.
Figure 7A:
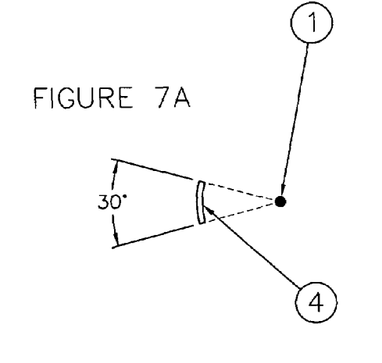
Figure 7B:
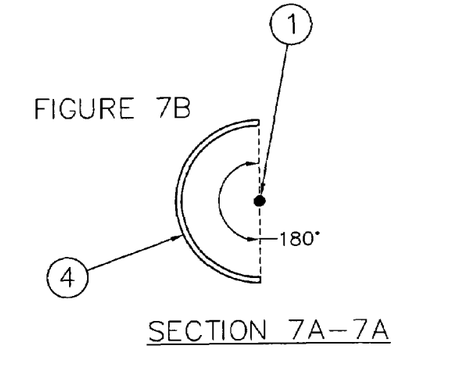
FIG. 7B shows a cross section when the arcuate shaped shield member occupies about 30 degrees of arc.

Even a single side band shield member should be more efficient that the prior art single side cable if the single side band shield member encompasses more annular space around the conductor than the prior art side cable. Further, a shaped side band shield member should offer improved efficiency. For instance, shown in FIG. 7A is a single side band occupying an arc of about 20-30 degrees about the conductor 1. Shown in FIG. 7B is a signal side band shield member that occupies about 180 degrees of arc. In both embodiments, a shaped band is used. Preferred shapes include arc segments and open triangular arcs (such as shown in FIG. 3A). Again, spacers are required to help maintain the desired spacing of the side shield members about the conductor, but the overall probe, in transport and installation still remains sufficiently flexible.

In all embodiments, if increased flexibility is required for transport, spacers could be installed between the shield members and the conductor during field installation.

For purposes of a capacitance level meter, the capacitance would be measured between the conductor member and the shield members or shield members. For a capacitance measurement, a design using arcuate shaped side band members is preferred to stiffen the side band members in order to maintain the spatial relationship of the side bands and probe. Alternatively, additional spacers could be utilized. Allowing too much fluctuation in the gap between the side bands and the probe could induce undesired variation in the capacitance readings.

Finally, instead of a series of side bands, a series of cables could be utilized. However, a series of cables as the side members is not preferred since a cable (say ½ diameter cable) is not as effective as a ¾ inch wide side band. Using similar diameter cables as side band will produce comparable waveguide effects, but the cost of materials is excessive as opposed to a thin flat side band member.

I claim:

1. A level meter device comprising an apparatus for detecting a signal from a probe that relates to a liquid level comprising a flexible probe, where the flexible probe includes a conductive flexible conductor and at least one conductive flexible band shield member disposed in a substantially non-coplanar parallel relationship with said conductor, and said conductor and shield member being offset from each other creating a substantially empty gap between said conductor and said shield member, a plurality of spacers positioned between said conductor and said band shield member to maintain said gap, said plurality of spacers being spaced apart along said probe, where said probe further comprises a plurality of conductive flexible band shield members each disposed in a substantially parallel non-coplanar relationship with said conductor.

2. The level meter of claim 1 where said flexible conductor comprises a flexible band.

3. The level meter of claim 1 where said flexible conductor comprises a flexible cable.

4. The level meter of claim 1 where said plurality of conductive flexible band shield members comprises two side band shield members orientated substantially parallel to each other, and where the conductor is disposed between said two shield members.

5. The level meter of claim 1 where one of said plurality of flexible band shield members is arcuate shaped.

6. The level meter of claim 1 wherein one said plurality of flexible band shield members occupies in horizontal cross section an angle of about 30 degrees or greater with respect to the center of said flexible conductor.

7. The level meter of claim 1 wherein said level meter comprises a guided wave level meter or a capacitance level meter.

8. A level meter comprising an apparatus for detecting a signal from a probe that relates to a liquid level, comprising a flexible probe, where the flexible probe includes a conductive flexible conductor and a conductive flexible shield member jacket substantially surrounding said conductor but offset from said conductor creating a substantially empty gap between said conductor and said shield member jacket wherein said flexible shield member jacket comprises a plurality of annular bands spaced apart vertically about said conductor.

9. The level meter of claim 8 wherein one of said plurality of annular bands comprises a braided jacket.

10. The level meter of claim 8 wherein one of said plurality of annular bands comprises a spiral band member.

11. The level meter of claim 8 wherein said level meter is a guided wave level meter or a capacitance level meter.

* * * * *